2,826,510

METHOD OF FORMING PHOSPHOR SCREENS

Donald W. Mayer, Colonia, N. J., assignor to Tung-Sol Electric Inc., a corporation of Delaware No Drawing. Application August 25, 1955
Serial No. 530,613

9 Claims. (Cl. 117—33.5)

The present invention relates to the formation of phosphor screens for cathode ray tubes, such as oscilloscopes, radar tubes, television receiving tubes and the like. The invention comprises an improvement in the process of settling luminescent material through a liquid on to a tube face that, as compared with settling methods now in commercial use, requires less time for settling, results in better adhesion of the phosphor layer to the tube wall and in a phosphor screen of improved luminosity.

Phosphor screens for cathode ray tubes are ordinarily formed by providing in the tube a cushion layer of water and a solution of a coagulent such as barium nitrate, barium acetate or acetic acid. A water dispersion of phosphors, such as zinc cadmium sulfide, zinc silicate, etc., combined with a solution of a colloidal material such as potassium or sodium silicate is distributed over the liquid bath in the tube through a wide mouthed funnel. The phosphor particles settle through the liquid bath to the inner face of the tube and are bound thereto by the adhesive action of the silicate. Both the speed of settling and the adhesive action of the silicate are enhanced by the presence of the coagulant. After the settling period the settling bath is drawn off and the tube baked to dry the formed screen.

I have found that much more rapid settling of the phosphors and better adhesion of the phosphors to the wall of the tube can be obtained if the conventional coagulent in the settling solution is replaced, in whole or in part, by a suitable volatile hydrochloride. When the hydrochloride is used alone in the settling solution no insoluble residue is left on the formed screen. A hydrochloride to be suitable for use in the improved settling process must be water soluble, at least to the extent of 0.1 gr. per 100 cc. of water at 20° C., must not precipitate at or be chemically changed by a pH of 8.5 or higher and must volatilize at temperatures below 350° C. Examples of hydrochlorides which meet these conditions are thiamine hydrochloride, hydroxylamine hydrochloride, ephedrine hydrochloride and strychnine hydrochloride. Relatively dilute solutions of these hydrochlorides have been found extremely effective to increase the settling speed and tenacity of adhesion of the phosphors to the tube wall. None leaves any insoluble residue on the deposited screen. The volatile hydrochloride in the settling solution lowers the zeta or electrokinetic potential of the barrier layer and thereby accelerates coagulation of the colloidal material introduced with the phosphor into the settling bath. The settling time, when a hydrochloride such as above mentioned is added to a settling bath containing barium nitrate, barium acetate or acetic acid is cut to about one-half to two-thirds of that now required in conventional practice. When the hydrochloride entirely replaces such conventional coagulant, the settling time is cut to about one-third of that now required.

Preferably the colloidal material is potassium silicate of mol ratio 3.45, that is $K_2O \cdot 3.45SiO_2$, which is available on the market under the name Kasil, a 14% water solution of Kasil being that ordinarily employed. The coagulant is preferably added in a weak water solution, say 1%, to the cushion layer of water.

The invention will be better understood by reference to the following specific examples of compositions of settling solutions suitable for use in the practice of the invention.

*Example 1*

A 17 inch rectangular cathode ray tube blank (a bulb having a rectangular face the diameter of which is 17") is placed face down on a tilting table or settling belt. Into the blank is introduced a volume of water to which is added 512 cc. of a 1% water solution of thiamine hydrochloride. Luminescent material, of which the screen is to be formed and dispersed in water to which is added 600 cc. of a 14% water solution of Kasil, is distributed over the liquid in the blank from a wide mouthed inverted funnel as in usual practice. The phosphors settle through the liquid and become bound to the surface of the tube face by the adhesive action of the silicate. Settling time is from 5 to 7 minutes. The settling solution is then decanted or gradually poured off and the tube blank and screen dried and baked to evaporate the hydrochloride and any remaining water of the cushion layer. The so formed phosphor screen adheres tenaciously to the wall of the tube blank and contains no insoluble residue which might interfere with the luminosity of the screen when in use.

*Example 2*

The same procedure as in Example 1 is followed except that instead of adding a solution of thiamine hydrochloride to the water in the blank, 80 to 90 parts of 1% hydroxylamine hydrochloride or 80 to 90 parts of 1% strychnine hydrochloride or 80 to 90 parts of 1% ephedrine hydrochloride are added for each 100 parts by volume of the Kasil solution added to the phosphor dispersion. The time of settling of the phosphors through each of the above indicated settling solutions for equal tube size is substantially the same as that of Example 1 and the tenacity of adhesion of the resulting screen is equally good.

*Example 3*

The same procedure as in Example 1 is followed except that the solution of 1% thiamine hydrochloride is replaced by 70 to 80 parts by volume of a mixture of a 1% solution of thiamine hydrochloride with a 1% solution of barium acetate or of barium nitrate or of acetic acid for each 100 parts by volume of the Kasil solution.

*Example 4*

The same procedure as in Example 3 is followed except that the 1% thiamine hydrochloride component of the mixed solution is replaced by an equal volume of a 1% water solution of ephedrine hydrochloride or of hydroxylamine hydrochloride or of strychnine hydrochloride.

*Example 5*

The same procedure as in Example 1 is followed except that the settling solution comprises 1 to 2 parts by volume of 1% thiamine hydrochloride and 70 to 80 parts by volume of 1% barium acetate. The settling time is about 10 minutes for a 17 inch tube blank. The tenacity of adhesion of the screen is substantially as good as when the settling solution comprises thiamine hydrochloride. However, an insoluble residue of barium remains upon the screen which may reduce screen luminosity.

*Example 6*

The same procedure as in Example 5 is followed except that the barium acetate is replaced by 70 to 80 parts by volume of a 1% water solution of barium nitrate or 80 to 90 parts of 1% water solution of acetic acid. The speed of settling and the resulting adhesion of phosphor screen to the tube are similar to that obtained by the process described in Example 5.

*Example 7*

The process of Examples 5 or 6 is followed except that substituted for the 1% thiamine hydrochloride is 1 to 2 parts of a 1% water solution of hydroxylamine hydrochloride or 1 to 2 parts of 1% water solution of ephedrine hydrochloride or 1 to 2 parts of 1% water solution of strychnine hydrochloride.

*Example 8*

The same procedure as followed as in any of the preceding examples except that the colloidal material employed in conjunction with the dispersion of phosphor in water is sodium silicate rather than Kasil. The speed of settling is equally good. The screen adhesion is satisfactory but not as good as when Kasil is employed.

From the foregoing examples it will be apparent that the improved results obtained by practice of the invention are due to the presence in the settling solution of the volatile hydrochlorides listed herein and that conventional coagulants such as barium nitrate, barium acetate and acetic acid may be entirely replaced by such volatile hydrochlorides or merely supplemented thereby. From the standpoint of cost the supplementing of standard coagulants by a relatively minute amount of the hydrochloride is preferred. From the standpoint of production of a more luminous screen and of greater speed of settling the complete substitution of the hydrochloride for the standard coagulant is preferred.

The following is claimed:

1. In the process of forming a luminescent screen on a tube wall wherein luminescent material is dispersed in water and distributed together with an aqueous solution of a colloidal silicate over an aqueous bath through which the material settles to the wall to form a luminescent screen, the improvement which comprises adding to the aqueous bath an aqueous solution of a coagulant for the colloidal silicate, the coagulant comprising at least in part a hydrochloride that is water soluble, that does not precipitate nor change chemically at or above a pH of 8.5 and that volatilizes at temperatures below 350° C.

2. In the process according to claim 1 wherein the colloidal silicate is in a 14% solution and 80 to 90 parts by volume of a 1% solution of the hydrochloride is added to the bath for each 100 parts by volume of the colloidal silicate solution, the hydrochloride being selected from the group consisting of thiamine hydrochloride, ephedrine hydrochloride, hydroxylamine hydrochloride and strychnine hydrochloride.

3. In the process according to claim 2 wherein the hydrochloride is thiamine hydrochloride.

4. In the process according to claim 1 wherein the colloidal silicate is in a 14% solution, the hydrochloride is in a 1% solution and is selected from the group consisting of thiamine hydrochloride, ephedrine hydrochloride, hydroxylamine hydrochloride and strychnine hydrochloride, the hydrochloride solution being mixed with a 1% solution of a compound selected from the group consisting of barium nitrate, barium acetate and acetic acid, 80 to 90 parts by volume of the mixed solution being added to the bath for each 100 parts by volume of the colloidal silicate solution.

5. In the process according to claim 4 wherein the hydrochloride is thiamine hydrochloride, there being 1 to 2 parts by volume of the hydrochloride solution added for each 100 parts by volume of the colloidal silicate solution.

6. The improvement according to claim 1 wherein the hydrochloride is selected from the group consisting of thiamine hydrochloride, ephedrine hydrochloride, hydroxylamine hydrochloride and strychnine hydrochloride.

7. The improvement according to claim 1 wherein the coagulant comprises a hydrochloride selected from the group consisting of thiamine hydrochloride, ephedrine hydrochloride, hydroxylamine hydrochloride and strychnine hydrochloride and a compound selected from the group consisting of barium nitrate, barium acetate and acetic acid.

8. In the process of forming a luminescent screen on a tube wall wherein luminescent material is dispersed in water and distributed together with a 14% water solution of colloidal potassium silicate over an aqueous bath through which the material settled to the wall to form a luminescent screen, the improvement which comprises adding to the aqueous bath 80 to 90 parts by volume of a 1% water solution of thiamine hydrochloride for each 100 parts by volume of the potassium silicate solution.

9. In the process of forming a luminescent screen on a tube wall wherein luminescent material is dispersed in water and distributed together with a 14% water solution of colloidal potassium silicate over an aqueous bath through which the material settles to the wall to form a luminescent screen, the improvement which comprises adding to the aqueous bath for each 100 parts by volume of the potassium silicate solution 1 to 2 parts by volume of a 1% aqueous solution of thiamine hydrochloride and about 80 parts by volume of a 1% solution of a compound selected from the group consisting of barium nitrate, barium acetate and acetic acid.

References Cited in the file of this patent

UNITED STATES PATENTS

| | | |
|---|---|---|
| 2,451,590 | Tidik et al. | Oct. 19, 1948 |
| 2,662,830 | Darlaston | Dec. 15, 1953 |
| 2,678,888 | Evans | May 18, 1954 |